Dec. 15, 1931.  W. G. HUMPHREYS ET AL  1,836,169
CHAIN CONNECTER
Filed July 15, 1929
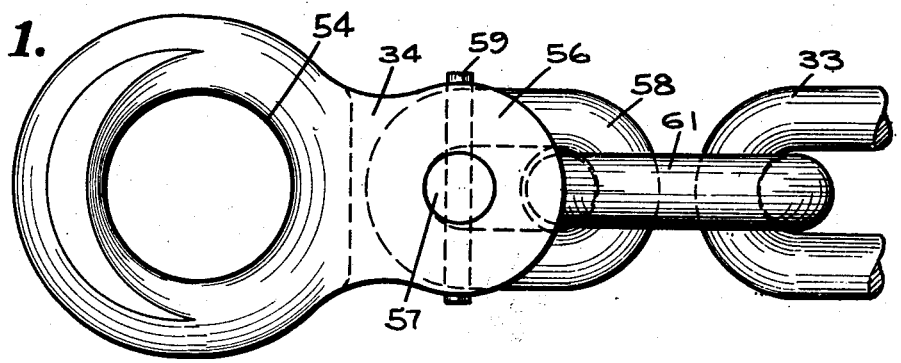
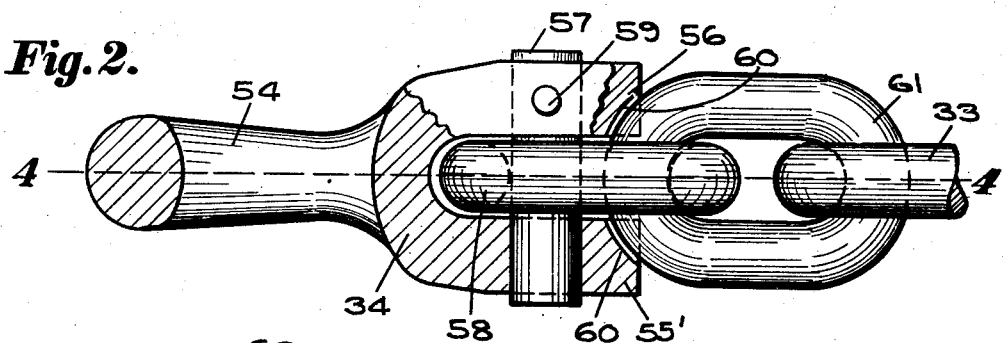
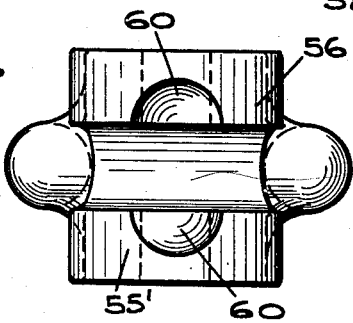
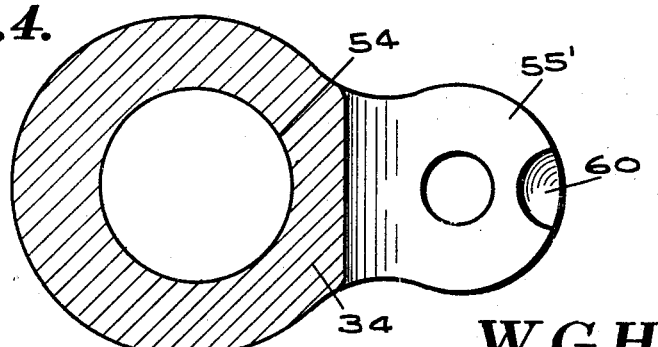
Inventors
W. G. Humphreys
O. R. Humphreys
By Arthur H. Sturges
Attorney Patented Dec. 15, 1931

1,836,169

UNITED STATES PATENT OFFICE

WALTER G. HUMPHREYS AND OMAR R. HUMPHREYS, OF OMAHA, NEBRASKA

CHAIN CONNECTER

Original application filed September 5, 1928, Serial No. 304,128. Divided and this application filed July 15, 1929. Serial No. 378,292.

The present invention relates to improvements in chain connecters and is a division of our prior application entitled "Drag-line excavating bucket," Serial No. 304,128, filed September 5, 1928.

An object of the present invention is to provide an improved chain connecter, whereby chains of stock sizes may be attached to the bucket without requiring welding, blacksmithing, or any labor further than simply attaching the chain to the bucket.

Another object of the invention resides in providing an improved means whereby a cable may be attached to the bucket without the use of the U-shaped clips.

A further object of the invention lies in providing an improved chain connecter in which the parts are simple, strong and of economical manufacture, and in which the association of the connecter with the chain is such as to avoid the twisting of the chain and the setting up of any torsional strain therein.

With the foregoing and other objects in view, the invention will be more fully described hereinafter, and will be more particularly pointed out in the claim appended hereto.

In the drawings, wherein like symbols refer to like or corresponding parts throughout the several views, Figure 1 is a plan view of an improved chain connecter constructed in accordance with the present invention and with a portion of the chain attached thereto.

Figure 2 is an edge view of the same with parts broken away and parts shown in sections.

Figure 3 is an end view of the improved chain connecter and

Figure 4 is a section taken through the improved chain connecter on the line 4—4 in Figure 2.

Referring more particularly to the drawings, 34 designates the body portion of an improved connecter member. The connecter members 34 are provided with the eyes 54 for receiving a pin such as the pin 55 shown in Figure 1 of our parent application, by which the connecter is pivotally secured to the drag clip or to any other appropriate support.

The portion of the connecters 34 which receive the chain are bifurcated, or in other words provided with the spaced parallel arms 55' and 56, which are perforated to receive the pin 57 passing through the arms and through the end link 58 of the drag chain, which is received between the arms 55' and 56. At 59 is shown the locking pin passing through the pivot pin 57. The ends of the arms 55' and 56 are provided with the curved and rounded recesses or cut away portions 60 to conform to and receive the convex end parts of the link 61 of the drag chain which is next adjacent the end link 58.

The drag chain itself is indicated at 33.

In the use of the device the improved chain connecter is included between the drag chain and the drag clip, and it is subjected to considerable strain. It must therefore be strong and it must co-operate with the drag chain 33 to carry a heavy load and to resist torsional strain set up in the chain 33.

It will be noted that the end link of the chain, namely, the link 58 is received to a greater degree of depth into and between the arms 55' and 56 than would otherwise be possible, by virtue of the fact that the adjacent end of the link 61 is receivable into the recesses 60 which are cut in the ends of the arms 55' and 56. These recesses are of spherical section in order to agree with the end portions of the links 61. Moreover the spherical recesses 60 open through the inner faces of the arms 55' and 56 and also through the outer end thereof in order to accommodate the link 61, which is snugly fitted in the recesses, and the co-operation of the recesses with the links avoids the turning of the links and the setting up of torsional strain. Moreover the engagement of the link 58 with the pin 57 on the one hand and the engagement of the link 61 against the walls of the recesses 60 on the other hand will prevent longitudinal play in the chain and this is desirable where the chain is subjected to longitudinal drawing movement as in the dragging of a drag line bucket. The side walls of the recesses 60 will also tend to support the link 61 and to hold it in an outwardly projecting rigid position and to prevent it from sagging downwardly.

We do not wish to be restricted to the size, form and proportions of the various parts, and obviously changes could be made in the construction herein described without departing from the spirit of the invention, it being only necessary that such changes fall within the scope of the following claim.

We claim:

A chain connecter comprising a supporting portion, and a bifurcated portion integral therewith whereby a pair of spaced apart parallel arms are provided, and means carried by said arms for securing a link of a chain to the connecter, the free ends of said arms having curved and rounded recesses therein adapted to conform to and receive the convex end parts of the next adjacent link of a chain, each of said recesses beginning at substantially the center of the free end of each arm and extending inwardly thereof.

In testimony whereof, we affix our signatures.

WALTER G. HUMPHREYS.
OMAR R. HUMPHREYS.